(12) United States Patent
Ohki

(10) Patent No.: US 7,837,183 B2
(45) Date of Patent: Nov. 23, 2010

(54) VISCOUS FLUID-FILLED DAMPER

(75) Inventor: Junji Ohki, Tokyo (JP)

(73) Assignee: Polymatech Co., Ltd., Tokyo (JP)

(*) Notice: Subject to any disclaimer, the term of this patent is extended or adjusted under 35 U.S.C. 154(b) by 153 days.

(21) Appl. No.: 11/498,108

(22) Filed: Aug. 3, 2006

(65) Prior Publication Data

US 2007/0029149 A1 Feb. 8, 2007

(30) Foreign Application Priority Data

Aug. 5, 2005 (JP) ............................. 2005-228635

(51) Int. Cl.
F16F 13/00 (2006.01)

(52) U.S. Cl. ....................... 267/140.11; 267/140.13; 248/562

(58) Field of Classification Search ............ 267/140.11, 267/136, 140.13, 141, 141.3, 141.4, 140.5; 248/560, 562, 634, 635, 636; 188/298; 720/651, 720/688, 692; 369/258.1, 263.1
See application file for complete search history.

(56) References Cited

U.S. PATENT DOCUMENTS

| | | | | |
|---|---|---|---|---|
| 4,787,607 A | * | 11/1988 | Geno et al. ............... | 267/64.27 |
| 5,145,039 A | * | 9/1992 | Morikawa et al. ........... | 188/298 |
| 5,323,885 A | * | 6/1994 | Fukunaga et al. ........... | 188/381 |
| 6,039,299 A | * | 3/2000 | Ohnishi et al. ............. | 248/562 |
| 6,392,982 B1 | * | 5/2002 | Kobayashi et al. .......... | 720/692 |
| 6,439,551 B1 | * | 8/2002 | Kato .......................... | 267/113 |
| 6,934,961 B2 | * | 8/2005 | Itakura ........................ | 720/692 |
| 2002/0089101 A1 | * | 7/2002 | Itakura ........................ | 267/136 |

FOREIGN PATENT DOCUMENTS

| | | |
|---|---|---|
| EP | 0 583 946 | 2/1994 |
| EP | 1 209 685 | 5/2002 |
| JP | 57 130826 | 8/1982 |
| JP | 09-282859 | 10/1997 |
| JP | 11-148532 | 6/1999 |
| JP | 2001-057068 | 2/2001 |

OTHER PUBLICATIONS

European Seaarch Report dated Nov. 15, 2006.

* cited by examiner

*Primary Examiner*—Robert A Siconolfi
*Assistant Examiner*—Mariano Sy
(74) *Attorney, Agent, or Firm*—Cermak Nakajima LLP; Tomoko Nakajima (57) ABSTRACT

Provided is a container body including a flexible portion made of a rubber-like elastic material and an annular connection portion made of a hard material in the shape of a substantially flat plate and having an upper surface to which the flexible portion is firmly fixed and a lower surface to which the lid body is firmly fixed. The flexible portion is provided, on a firm fixation region thereof that is firmly fixed to the annular connection portion, with a collar joint portion protruding widely in the direction of a plane of the annular connection portion. Therefore, the container body and the lid body are firmly coupled to each other, and the viscous fluid-filled damper can be reduced in height.

18 Claims, 9 Drawing Sheets

VISCOUS FLUID-FILLED DAMPER

BACKGROUND OF THE INVENTION

1. Field of the Invention

The present invention relates to vibration damper for disk devices such as optical disk devices and magneto-optical disk devices which are used for acoustic equipment, video equipment, information equipment, various kinds of precision equipment, and the like regardless of whether they are mounted on vehicles or designed for household appliances. In particular, the present invention relates to a viscous fluid-filled damper adapted to damp vibrations of a supported body such as a mechanical chassis that is composed of a motor, an optical pickup, a disk table, and the like.

2. Description of the Related Art

Figure 8:
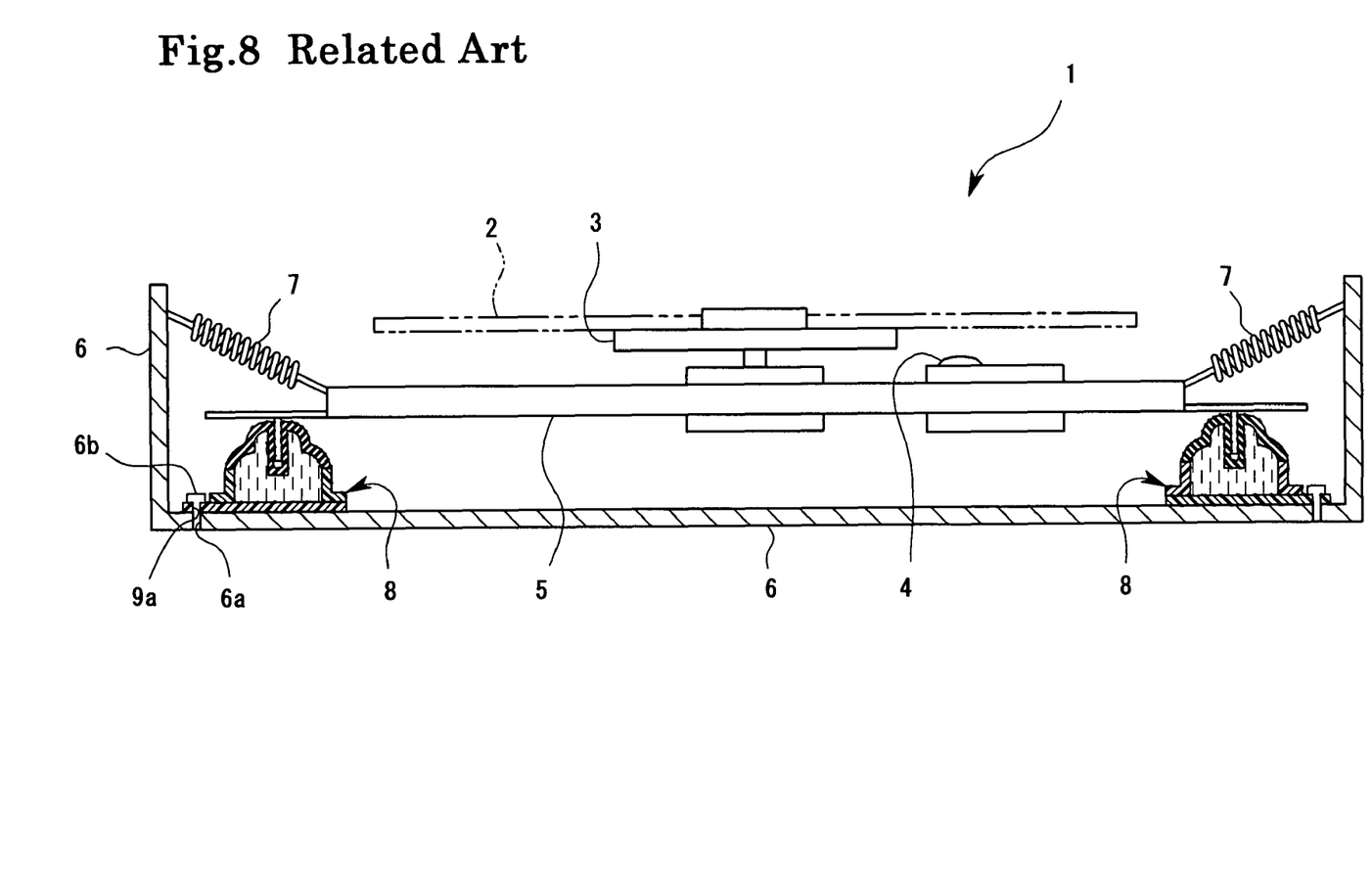
FIG. 8 is a schematic view showing an internal structure of a disk device mounted with a conventional viscous fluid-filled damper.

As shown in FIG. 8 as an example, a disk device 1 is structured such that a disk 2 for recording and playback, such as an optical disk or a magneto-optical disk in a format of a CD or a CD-ROM, is horizontally chucked on a disk table 3, that the disk 2 is rotated integrally with the disk table 3 at a high speed, and that an optical pickup 4 approaches the disk 2 and tracks the disk 2 in a radial direction of the disk 2 to record data thereon and play back the contents thereof. A coil spring 7 joins a mechanical chassis 5 to a box body 6 of the disk device 1, and a viscous fluid-filled damper 8 is interposed between the mechanical chassis 5 and the box body 6, so the disk device 1 blocks off or damps vibrations transmitted from the outside.

Figure 9:
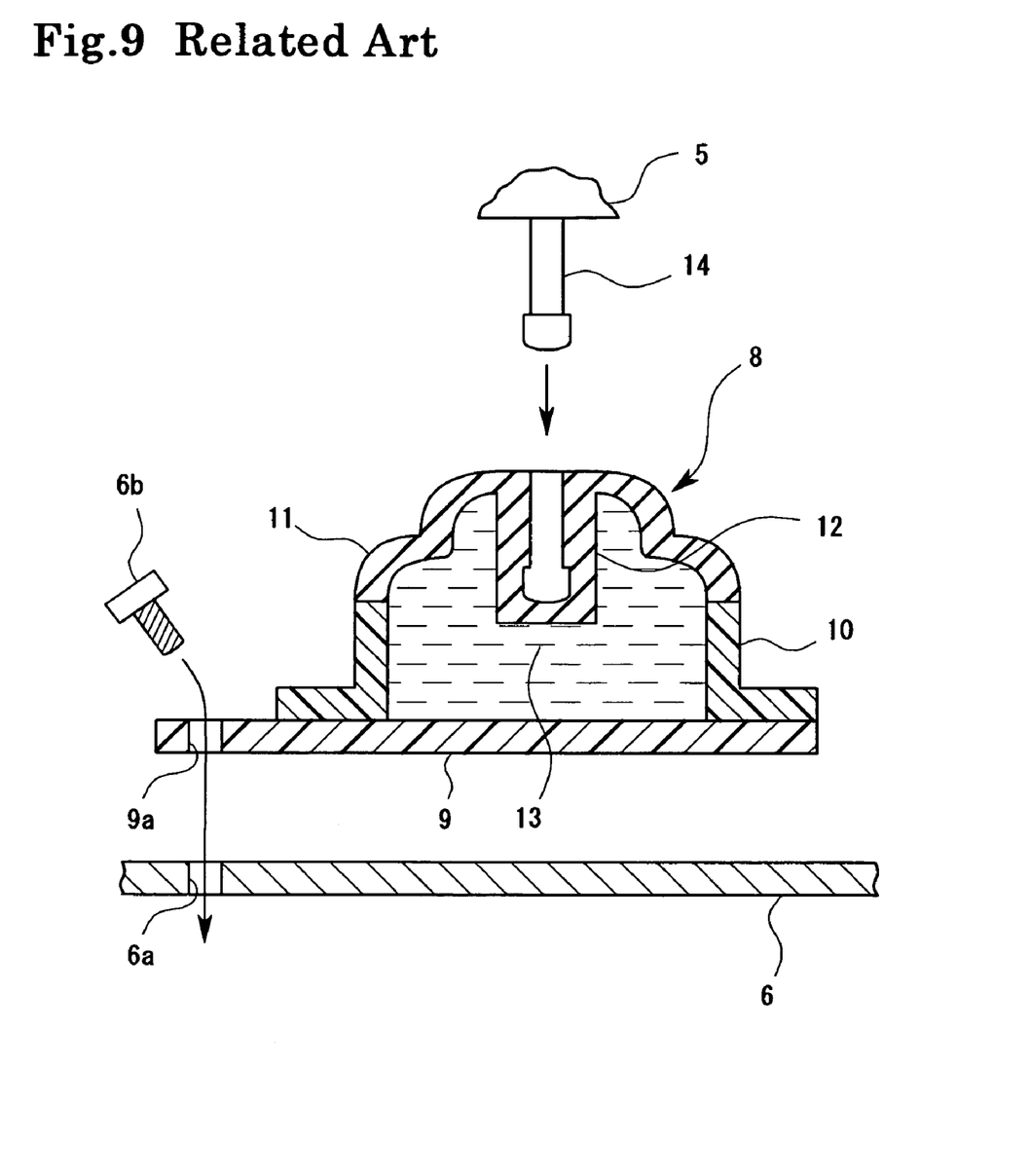
FIG. 9 is a cross-sectional explanatory view of the conventional viscous fluid-filled damper shown in FIG. 8, explaining a method of mounting the viscous fluid-filled damper to a mechanical chassis and a box body.

As shown in FIG. 9, in the viscous fluid-filled damper 8 constructed as described above, a container body includes a stirring recess portion 12 made of a rubber-like elastic material protruding into the damper 8, a flexible portion 11 with a corrugated longitudinal cross-section which is deformed through vibrations, and a peripheral wall portion 10 made of a hard resin assuming a tubular shape. The viscous fluid-filled damper 8 is obtained by firmly fixing a lid body 9 made of a hard resin to the peripheral wall portion 10, filling an inner space enclosed by the container body and the lid body 9 with a viscous fluid 13 such as silicon oil, and filling in the viscous fluid. The viscous fluid-filled damper 8 is fitted to the disk device 1 by inserting a stirring shaft 14 provided on the mechanical chassis 5 serving as a supported body into the stirring recess portion 12 while inserting a screw 6b into a screw hole 9a bored through the lid body 9 and a screw hole 6a bored through the box body 6. Such the viscous fluid-filled damper is also disclosed in, for example, JP 2001-57068 A.

The viscous fluid-filled damper 8 shown in FIG. 9 is excellent in that the peripheral wall portion 10 made of the hard resin with a substantially tubular shape protrudes perpendicularly to the lid body 9 to ensure a volume for accommodating the viscous fluid 13 and guarantee shape stability of the container body. However, with the current tendency to reduce the thickness of the disk device 1, the viscous fluid-filled damper has also been required to have a further reduced thickness without deterioration in performance.

SUMMARY OF THE INVENTION

The present invention has therefore been made with a view to obtaining a viscous fluid-filled damper with a further reduced thickness by reviewing an entire structure thereof.

Thus, according to the present invention, there is provided a viscous fluid-filled damper for damping vibrations transmitted between a supporting body and a supported body, comprising: a container body; a lid body for closing an opening end of the container body; and a viscous fluid filled in an inner space enclosed by the container body and the lid body, in which the container body is provided with a flexible portion made of a rubber-like elastic material, and an annular connection portion made of a hard resin with a shape of a substantially flat plate and having an upper surface to which the flexible portion is firmly fixed and a lower surface to which the lid body is firmly fixed; and the flexible portion has, on a firm fixation region thereof which is firmly fixed to the annular connection portion, a collar joint portion protruding widely in a direction of a plane of the annular connection portion.

In the viscous fluid-filled damper having the viscous fluid filled in with the container body and the lid body, the container body is provided with the flexible portion made of the rubber-like elastic material, and the annular connection portion made of the hard resin material assuming the shape of the substantially flat plate and having the upper surface to which the flexible portion is firmly fixed and the lower surface to which the lid body is firmly fixed. The flexible portion is provided, on the firm fixation region thereof with respect to the annular connection portion, with the collar joint portion protruding widely in the direction of the plane of the annular connection portion. Therefore, the viscous fluid-filled damper can be reduced in height. Further, since the container body and the lid body are coupled to each other through the hard materials, they are firmly coupled to each other with ease.

A collar joint portion may be provided with protruding widely in a direction extending horizontal with respect to the lid body from the bellows portion with a corrugated longitudinal cross-section of the flexible portion which is deformed through vibrations. When the collar joint portion protruding widely in the direction extending horizontal with respect to the lid body from the bellows portion of the flexible portion is provided, a large contact area between the flexible portion made of the rubber-like elastic material and the annular connection portion made of the hard resin can be ensured even if the flexible portion is reduced in thickness. As a result, the rubber-like elastic material and the hard resin can be firmly coupled to each other. Further, a large contact area with the lid body in a horizontal direction (i.e., crosswise direction) and a small contact area with the lid body in a vertical direction (i.e., lengthwise direction) can be ensured. In consequence, the viscous fluid-filled damper can be reduced in height.

The annular connection portion may be provided with a coupling portion coupled to the supporting body or the supported body. Since the annular connection portion is provided with the coupling portion coupled to the supporting body or the supported body, the container body can be firmly coupled to the supporting body or the supported body. Both forces transmitted from the supporting body and the supported body are directly applied to the container body, so a force transmitted from the outside of the viscous fluid-filled damper is not directly applied to a boundary between the container body and the lid body. Therefore, the viscous fluid-filled damper can be structured such that the container body and the lid body are unlikely to separate from each other, and that the viscous fluid is unlikely to leak out.

Meanwhile, at an end of the flexible portion opposite to the annular connection portion may be provided with a coupling top portion made of a hard resin, which is coupled, to the supporting body or the supported body. Since at an end of the flexible portion opposite to the annular connection portion is provided with the coupling top portion made of the hard resin which is coupled to the supporting body or the supported body, the flexible portion can be firmly coupled to the shaft provided on the supporting body side or the supported body side. By causing the viscous fluid to flow, a sufficient viscosity resistance can be produced.

The coupling top portion may be so formed as not to substantially protrude toward the inner space of the container body. That is, while being coupled to the supporting body or the supported body, the coupling top portion is so shaped as to protrude barely into the inner space of the container body. Therefore, the coupling top portion may not have a region protruding far into the inner space of the container body to stir the viscous fluid, such as the stirring recess portion provided in the conventional viscous fluid-filled damper. Accordingly, the viscous fluid-filled damper can be reduced in height in comparison with the conventional viscous fluid-filled damper, which requires at least the height for accommodating the stirring recess portion. In the conventional viscous fluid-filled damper, the stirring recess portion is restrained from moving so as not to touch the peripheral wall portion or the lid body. However, the movable range of the coupling top portion can be widened when the stirring recess portion is dispensed with, so the viscous fluid-filled damper can achieve a great vibration damping effect despite downsizing thereof.

The bottom surface of the coupling top portion may be exposed inside the container body. Since the bottom surface of the coupling top portion is exposed inside the container body, there is no need to cover the bottom surface of the coupling top portion with the flexible portion. Therefore, the viscous fluid-filled damper can further be reduced in height in comparison with the case in which the bottom surface of the coupling top portion is covered with the flexible portion.

The coupling top portion may have the shaft receiving hole corresponding in shape to the shaft provided on the supporting body or the supported body to receive the shaft. Since the shaft receiving hole corresponding in shape to the shaft to receive it is provided, firm coupling with the shaft, which is provided on the supporting body or the supported body, can be ensured. As a result, the viscous fluid-filled damper can be structured such that the shaft is unlikely to fall out therefrom. In other words, the shaft can be made less likely to fall out, and the contact area between the shaft and the shaft receiving hole can be reduced in comparison with the case in which the shaft is accommodated in the stirring recess portion made of the rubber-like elastic material.

The supported body may be a mechanical chassis and the supporting body may be a box body of the disk device. When the supported body and the supporting body are the mechanical chassis and the box body, respectively, the disk device, such as an optical disk device or a magneto-optical disk device, can be downsized and reduced in thickness without causing a reduction in vibration damping force of the disk device.

The viscous fluid-filled damper according to the present invention can be reduced in height while allowing the disk device mounted therewith to be reduced in height. In addition, firm coupling to the supporting body or the supported body and among the respective members constituting the viscous fluid-filled damper is ensured, so the viscous fluid-filled damper is prevented from deteriorating in vibration damping effect or being damaged even when the mechanical chassis or the box body is exposed to strong vibrations or a strong impact. Thus, the viscous fluid-filled damper can produce a stable vibration damping effect. In addition, the viscous fluid-filled damper can be easily mounted with the lid body after having been filled with the viscous fluid, while being allowed to be manufactured at low cost.

The present invention is not restricted to the above description, and the advantages, features, and uses of the present invention will become further apparent from the following description given with reference to the accompanying drawings. Further, it should be understood that all appropriate modifications not departing from the gist of the present invention are to be covered by the scope of the present invention.

DETAILED DESCRIPTION OF THE PREFERRED EMBODIMENTS

The present invention will be described in detail with reference to the accompanying drawings. In the drawings, various portions and components are indicated by reference symbols. In embodiments of the present invention, the same description will be omitted when there is no change in materials, manufacturing methods, and the like of respective members.

First Embodiment

Figure 1:
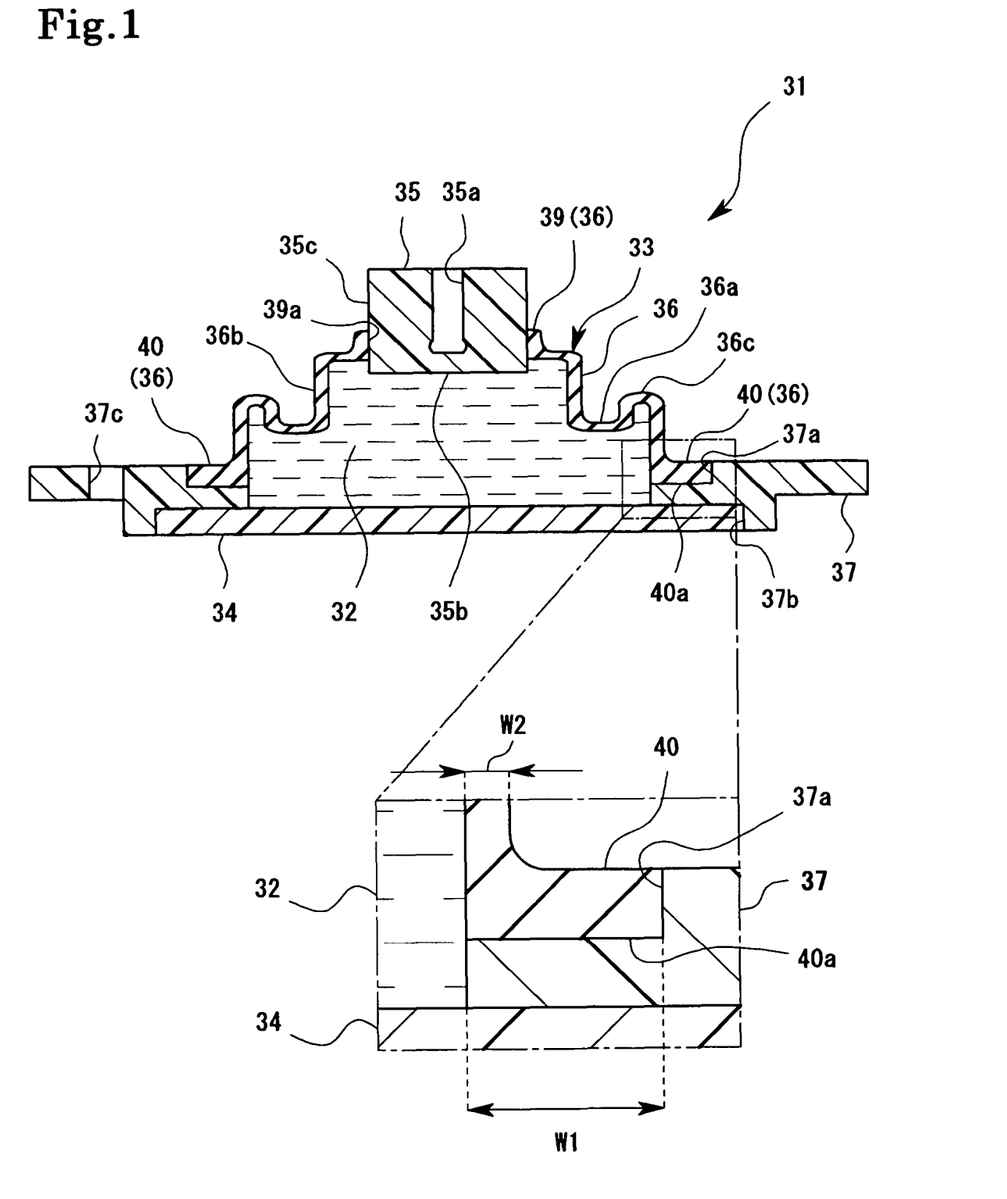
FIG. 1 is a cross-sectional view taken along the line I-I of FIG. 2, showing a viscous fluid-filled damper according to a first embodiment of the present invention.
Figure 2:
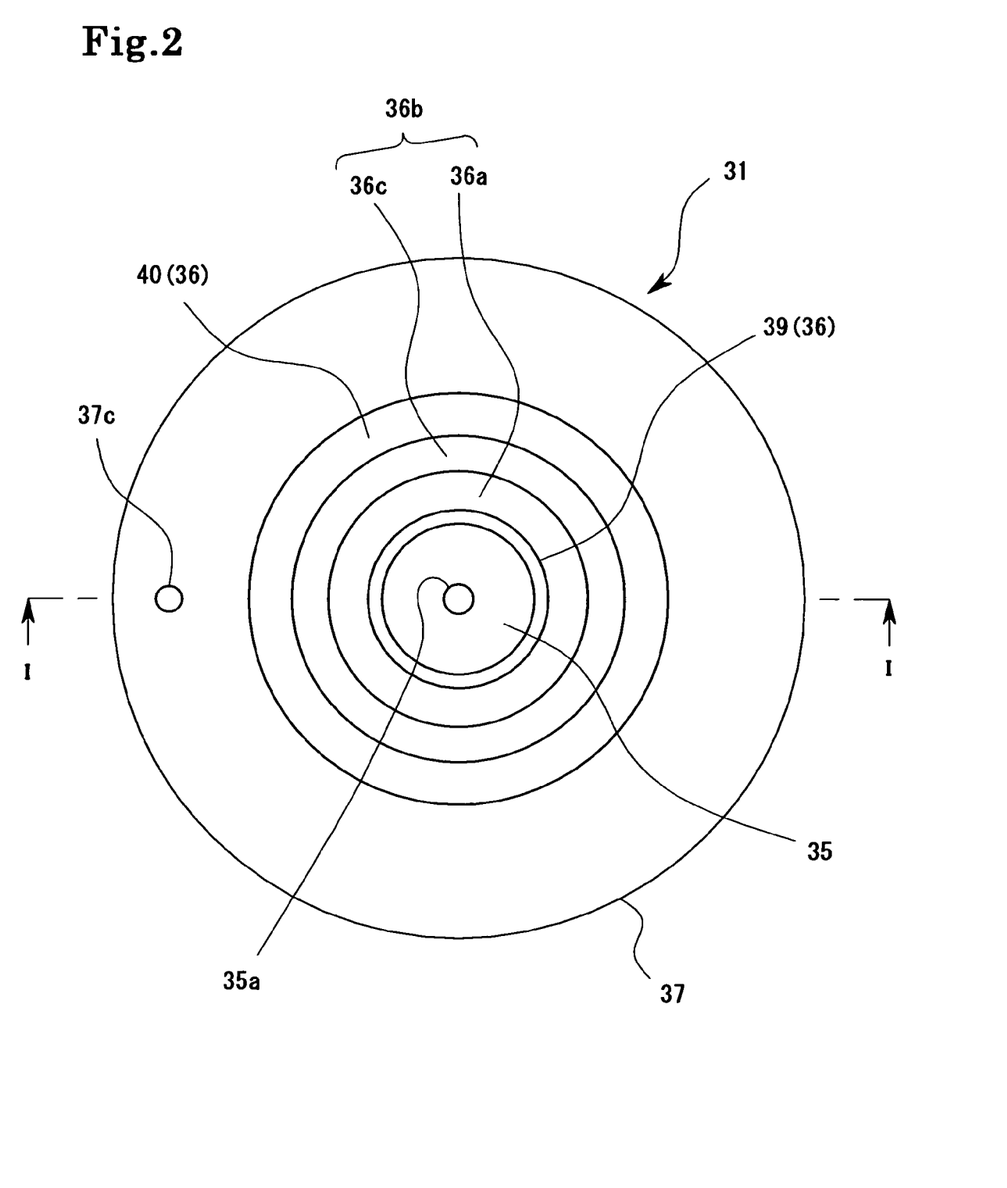
FIG. 2 is a plan view of the viscous fluid-filled damper of FIG. 1.
Figure 3:
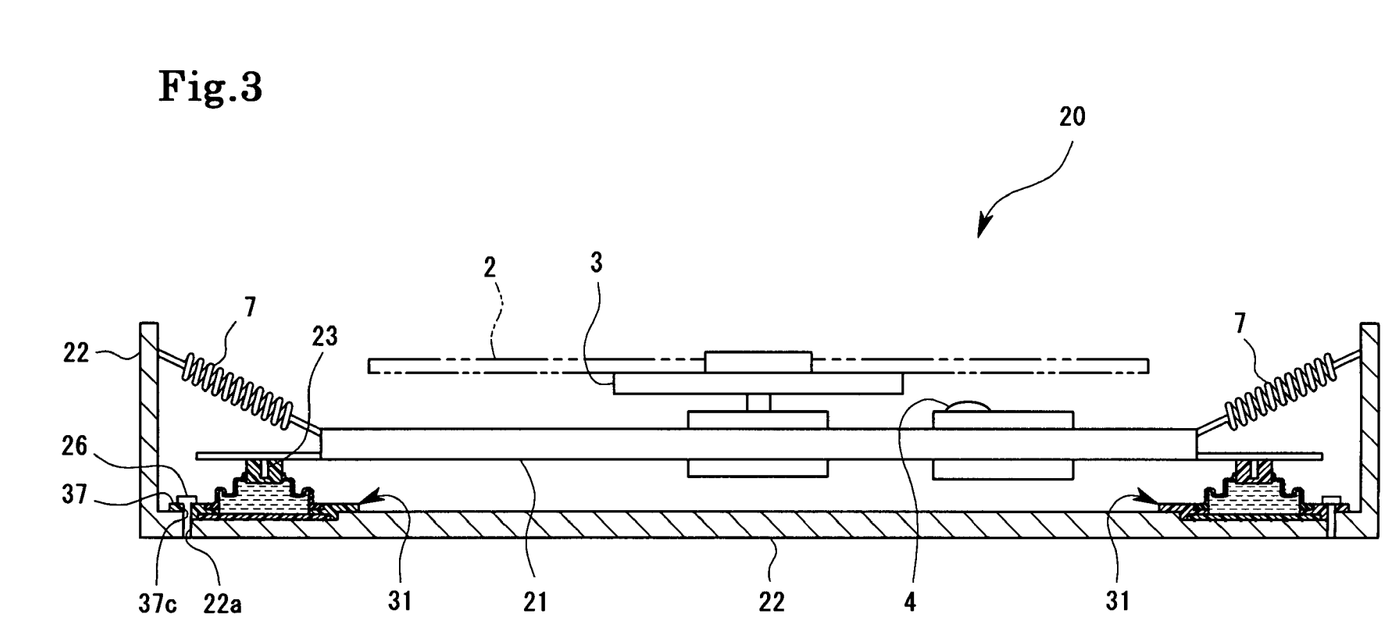
FIG. 3 is a schematic view showing the viscous fluid-filled damper of FIG. 1 and a mounting structure thereof, representing an internal structure of a disk device.

FIGS. 1 to 3

FIGS. 1 to 3 show a viscous fluid-filled damper 31 according to the first embodiment of the present invention. FIG. 1 is a longitudinal cross-sectional view of the viscous fluid-filled damper 31, and FIG. 2 is a plan view thereof. FIG. 3 shows a state in which the viscous fluid-filled dampers 31 are mounted to a disk device 20. As shown in FIG. 1, the viscous fluid-filled damper 31 is equipped with a viscous fluid 32, a container body 33, and a lid body 34 made of a hard resin which closes an opening end of the container body 33. The container body 33 is formed of a coupling top portion 35 made of a hard resin coupled to a mechanical chassis 21 serving as a supported body, a flexible portion 36 made of a rubber-like elastic material, and an annular connection portion 37 made of a hard resin. The flexible portion 36 comprises a bellows portion 36b with a corrugated longitudinal cross-section which is deformed through vibrations, a tubular joint portion 39 coupled to the coupling top portion 35, and a collar joint portion 40 coupled to the annular connection portion 37. An upper part, a lower part, a right part, and a left part of the viscous fluid-filled damper 31 according to this embodiment of the present invention are not uniquely determined depending on the manner in which the viscous fluid-filled damper 31 is mounted or depending on the region where the viscous fluid-filled damper 31 is mounted. For convenience of explanation, however, the following description will be given on the assumption that the coupling top portion 35 and the lid body 34 are located above and below, respectively.

The coupling top portion 35, which is formed of a hard resin, is coupled to the mechanical chassis 21 serving as the supported body. A shaft receiving hole 35a is formed through a center of the coupling top portion 35. The shaft receiving hole 35a is adapted to receive a shaft 23. The shaft 23 can be provided on the mechanical chassis 21. The shaft receiving hole 35a corresponds in shape to the shaft 23. When the shaft 23 is inserted into the shaft receiving hole 35a, the shaft 23 is engaged therewith and cannot fall out therefrom with ease.

The coupling top portion 35 has no region corresponding to a stirring recess portion 12 formed in a conventional viscous fluid-filled damper 8. In other words, the coupling top portion 35 does not substantially protrude toward an inner space of the container body 33. The coupling top portion 35 is so formed as to be longer in a horizontal direction than in a vertical direction. As shown in FIG. 1, a bottom surface 35b of the coupling top portion 35 protrudes toward the inner space of the container body 33 beyond a coupling surface coupled to the flexible portion 36, but does not protrude as far as a valley portion 36a of the flexible portion 36. The coupling top portion 35 is coupled on a lateral surface 35c thereof to an inner peripheral surface 39a of the tubular joint portion 39 of the flexible portion 36. However, the bottom surface 35b is not covered with the flexible portion 36, so the hard resin is exposed inside the container body 33. Thus, despite the construction in which the tubular joint portion 39 is simply coupled to the lateral surface 35c of the coupling top portion 35 without covering the bottom surface 35b of the coupling top portion 35, the coupling top portion 35 assumes a laterally wide and thick shape. Therefore, a large joint area between the coupling top portion 35 and the flexible portion 36 can be ensured, so the coupling top portion 35 and the flexible portion 36 are firmly coupled to each other.

The flexible portion 36 has a bellows portion 36b with a corrugated longitudinal cross-section, which is expanded and contracted to be deformed through vibrations. The bellows portion 36b has a valley portion 36a formed as a depressed portion, and a mountain portion 36c formed as a projecting portion; and the valley portion 36a has a bottom located on the lid body side with respect to a top of the mountain portion 36c to allow the bellows portion 36b to be displaced by a large distance in a horizontal direction and a vertical direction. A collar joint portion 40 of the flexible portion 36 is in contact with the fixation region 40a of the annular connection portion 37. The plane of the annular connection portion 37 can be in parallel with the plane of the lid body 34. As shown in FIG. 1, the collar joint portion 40 protrudes in the direction of the plane of the annular connection portion 37. The collar joint portion 40 is formed on the fixation region 40a of the flexible portion 36, which is fixed firmly to the annular connection portion 37.

The annular connection portion 37, which is formed of a hard resin in the shape of a substantially flat plate, is provided to allow the container body 33 containing the viscous fluid 32 to be firmly fixed to the lid body 34 with ease. The annular connection portion 37 has a rubber-side recess portion 37a for accommodating the collar joint portion 40 and a lid-side recess portion 37b for accommodating the lid body 34. The rubber-side recess portion 37a and the lid-side recess portion 37b are both wider in a horizontal direction than in a vertical direction. In this embodiment of the present invention, the annular connection portion 37 is coupled to the collar joint portion 40 of the flexible portion 36 in a direction parallel to the lid body 34 (i.e., horizontal direction: crosswise direction). Therefore, the fixation region 40a of coupling between the flexible portion 36 and the annular connection portion 37 has a horizontal width W1 with respect to the lid body 34, which is larger than a thickness W2 of the flexible portion 36. Therefore, a large contact area between the collar joint portion 40 and the annular connection portion 37 is ensured to achieve sufficient coupling. A screw hole 37c to be firmly fixed to a box body 22 of the disk device 20 serving as the supporting body is bored through the annular connection portion 37 constructed as described above, as a coupling portion for the box body 22.

Next, the materials constituting the respective portions of the viscous fluid-filled damper 31 will be described. The coupling top portion 35 may be formed from a thermoplastic resin. Likewise, the annular connection portion 37 may be formed from a thermoplastic resin. The coupling top portion 35 may also be formed from a thermoplastic resin. In this regard, a thermoplastic resin, which exhibits good workability and allows integral molding with the rubber-like elastic material, be selected as the hard resin forming any one of the coupling top portion 35, the annular connection portion 37, and the lid body 34. When a consideration is given to performances required of target members, such as dimensional accuracy, heat resistance, mechanical strength, durability and reliability, a reduction in weight, and workability of the target members, thermoplastic resins such as a polyethylene resin, a polypropylene resin, a polyvinyl chloride resin, a polystyrene resin, an acrylonitrile-styrene-acrylate resin, an acrylonitrile-butadiene-styrene resin, a polyamide resin, a polyacetal resin, a polycarbonate resin, a polyethylene terephthalate resin, a polybutylene terephthalate resin, a polyphenylene oxide resin, a polyphenylene sulfide resin, a polyurethane resin, a polyphenylene ether resin, a modified polyphenylene ether resin, a silicone resin, a polyketone resin, and liquid crystal polymer can be mentioned as the materials constituting the respective portions of the viscous fluid-filled damper 31. These respective portions of the viscous fluid-filled damper 31 may include any one of the coupling top portion 35, the annular connection portion 37, and the lid body 34. The thermoplastic resins noted hereinabove can be used either alone or as composite materials. A filling material such as powdery or fibrous metal, glass, and filler may be added to these thermoplastic resins to enhance the dimensional accuracy or the heat resistance.

The flexible portion 36 may be formed from a synthetic rubber or a thermoplastic elastomer. Examples of the synthetic rubber are from the group consisting of styrene butadiene rubber, butadiene rubber, chloroprene rubber, nitrile butadiene rubber, butyl rubber, urethane rubber, silicone rubber, fluorine rubber, and acryl rubber. Examples of the thermoplastic elastomer are from the group consisting of various kinds of thermoplastic elastomer of styrene type, olefin type, urethane type, ester type, and vinyl chloride type.

The viscous fluid 32 viscously flows within the sealed container to absorb vibration energy. In particular, the viscous fluid 32 may exhibit viscosity, time-lapse stability within the sealed container, and heat resistance. The viscous fluid 32 may be in the form of a liquid alone. The liquid found within the viscous fluid 32 may be silicone oil. The liquid found within the viscous fluid 32 being silicone grease is also within the scope of the invention. Solid particles may be added to the liquid found within the viscous fluid 32. Scattered throughout the liquid found within the viscous fluid 32, these solid particles exhibit no reactivity and no solubility to the liquid to the viscous fluid 32. Examples of the silicone oil are from the group consisting of dimethyl silicone oil, methyl phenyl silicone oil, methyl hydrogen silicone oil, and fluorine modified silicone oil. The solid particles exhibiting no reactivity and no solubility to the silicone oil are from the group consisting of silicone resin powder, polymethylsilsesquioxane powder, wet silica powder, dry silica powder, glass bead, and glass balloon. Moreover, the solid particles exhibiting no reactivity and no solubility to the silicone oil may be from a material obtained by subjecting to surface treatment any of the particles from the group consisting of silicone resin powder, polymethylsilsesquioxane powder, wet silica powder, dry silica powder, glass bead, and glass balloon. The liquids and solid particles described hereinabove can be used either alone or in combination with one another. As a substitute for the silicone oil or the silicone grease, the viscous fluid 32 can be non-silicone grease having scattered therein solid particles that exhibit no reactivity and no solubility to oils. Oils from the group consisting of a poly-α-olefin type, a paraffin type, and a polyethylene glycol type can also be used as the viscous fluid 32. The same substances as described above can be used as the solid particles.

The viscous fluid-filled damper 31 can be integrally formed according to a resin molding method such as co-injection molding of a hard resin material and a soft resin material. For instance, the coupling top portion 35, the flexible portion 36, and the annular connection portion 37 may be integrated with one another through two-color molding, insert molding, or the like to form the container body 33. The container body 33 is filled with the viscous fluid 32, which is then filled in with the lid body 34. In coupling the container body 33 to the lid body 34, a method such as ultrasonic fusing can be adopted.

The shaft 23 provided on the mechanical chassis 21 may be formed of a metal. Likewise, the shaft 23 may be formed of a hard resin. The hard resin used to form the shaft 23 may be the hard resin described hereinabove.

To connect the viscous fluid-filled damper 31 to the mechanical chassis 21, the shaft 23 provided on the mechanical chassis 21 is inserted into the shaft receiving hole 35a of the viscous fluid-filled damper 31. To connect the viscous fluid-filled damper 31 to the box body 22, as shown in FIG. 3, a screw 26 is passed through the screw hole 37c bored through the annular connection portion 37 and a screw hole 22a bored through the box body 22, and then fastened.

The viscous fluid-filled damper 31 has the annular connection portion 37 assuming the shape of a flat circular ring. Moreover, the viscous fluid-filled damper 31 is reduced in height in comparison with the conventional viscous fluid-filled damper 8. Further, the clearance between the mechanical chassis 21 and the box body 22 can be narrowed, so the disk device 20 can be downsized and reduced in thickness. The width W1 of the coupling surface between the collar joint portion 40 and the annular connection portion 37 is larger than the thickness W2 of the flexible portion 36, so a large coupling area between the collar joint portion 40 and the annular connection portion 37 can be ensured. Consequently, the viscous fluid-filled damper 31 is not damaged due to the firm coupling between the collar joint portion 40 and the annular connection portion 37 even when the coupling top portion 35 has greatly oscillated in various directions, that is, upward, downward, rightward, and leftward. In addition, in the case of coupling the container body 33 and the lid body 34, the hard resin materials are coupled to each other, so a large coupling force is ensured therebetween. The lid body 34 can be firmly fixed to the container body 33 with ease according to ultrasonic fusing or the like after the container body 33 has been filled with the viscous fluid 32. As a result, the viscous fluid-filled damper 31 can be manufactured with ease.

Because the shaft 23 provided on the supporting body or the supported body is made of the hard resin or the metal, and the shaft receiving hole 35a of the viscous fluid-filled damper 31 is also made of the hard resin, the hard materials are coupled to each other. Therefore, the coupling portion is unlikely to be deformed, so a firm coupling state is achieved. Thus, the viscous fluid-filled damper 31 can be prevented from falling out with ease.

The coupling top portion 35 may be made of the hard resin, and the bottom surface 35b of the coupling top portion 35 does not protrude into the container body 33. Therefore, the coupling top portion 35 can greatly fluctuate with respect to the lid body 34 in various directions, that is, upward, downward, rightward, and leftward. Even in such the case, since the collar joint portion 40 made of the rubber-like elastic material assuming the predetermined shape is coupled to the annular connection portion 37 made of the hard resin, a large coupling force is ensured therebetween. Thus, the viscous fluid-filled damper 31 is unlikely to cause breakage or fluid leakage despite a reduced height, and produces an excellent vibration damping effect.

Second Embodiment

Figure 4:
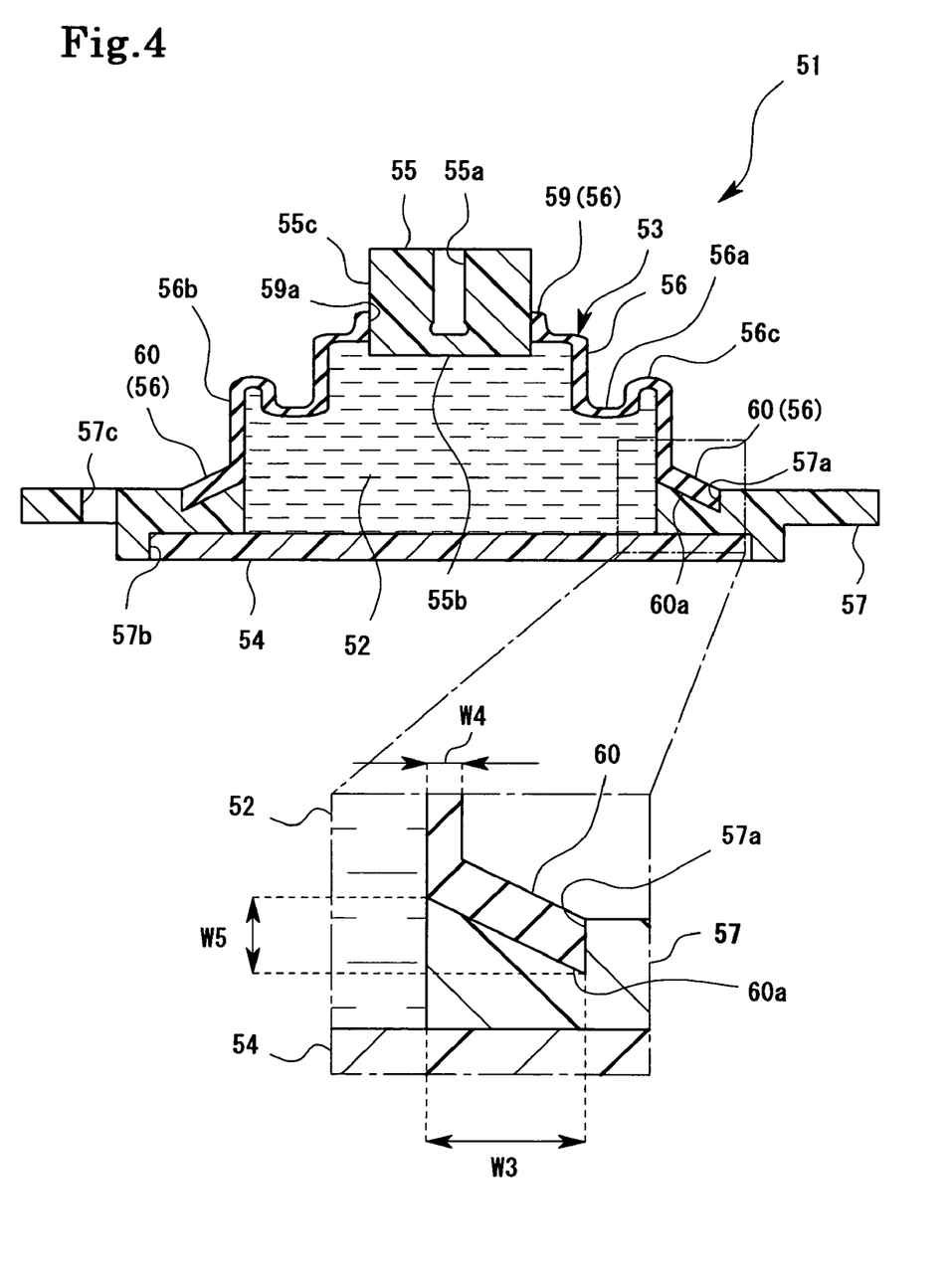
FIG. 4 is a cross-sectional view corresponding to FIG. 1, showing a viscous fluid-filled damper according to a second embodiment of the present invention.

FIG. 4

FIG. 4 shows a viscous fluid-filled damper 51 according to the second embodiment of the present invention. The viscous fluid-filled damper 51 according to the second embodiment of the present invention is different from the viscous fluid-filled damper 31 according to the first embodiment of the present invention in the direction in which a collar joint portion 60 provided on a firm fixation region 60a between the flexible portion 56 and the annular connection portion 57 is directed to. That is, the firm fixation region 60a is obliquely formed from the direction of the tube axis of the flexible portion 56 instead of extending parallel to the lid body 54. Nevertheless, the firm fixation region 60a is formed such that a width W3 of a projection plane on the lid body 54 is larger than a thickness W4 of the flexible portion 56. The firm fixation region 60a is also formed such that the width W3 is larger than a height W5 of a projection plane thereof in a direction perpendicular to the lid body 54. In addition, a rubber-side recess portion 57a provided in the annular connection portion 57 is also different because of a change in the shape of the collar joint portion 60. The viscous fluid-filled damper 51 according to the second embodiment of the present invention is identical to the viscous fluid-filled damper 31 according to the first embodiment of the present invention in other constructional details and the members to be used.

Since the width W3 of the projection plane of the tubular joint portion 60 on the lid body 54 is larger than the width W4 of the flexible portion 56, the viscous fluid-filled damper 51 is also firmly coupled when a coupling top portion 55 greatly oscillates in various directions, that is, upward, downward, rightward, and leftward. Further, since the width W3 is larger than the height W5 of the projection plane of the collar joint portion 60 in the direction perpendicular to the lid body 54, a large coupling force between the collar joint portion 60 and the annular connection portion 57 is ensured even if the viscous fluid-filled damper 51 is formed with a reduced height. Also, the viscous fluid-filled damper 51 has a coupling force large enough to prevent the collar joint portion 60 and the annular connection portion 57 from being decoupled from each other even when the coupling top portion 55 greatly moves in various directions.

Third Embodiment

Figure 5:
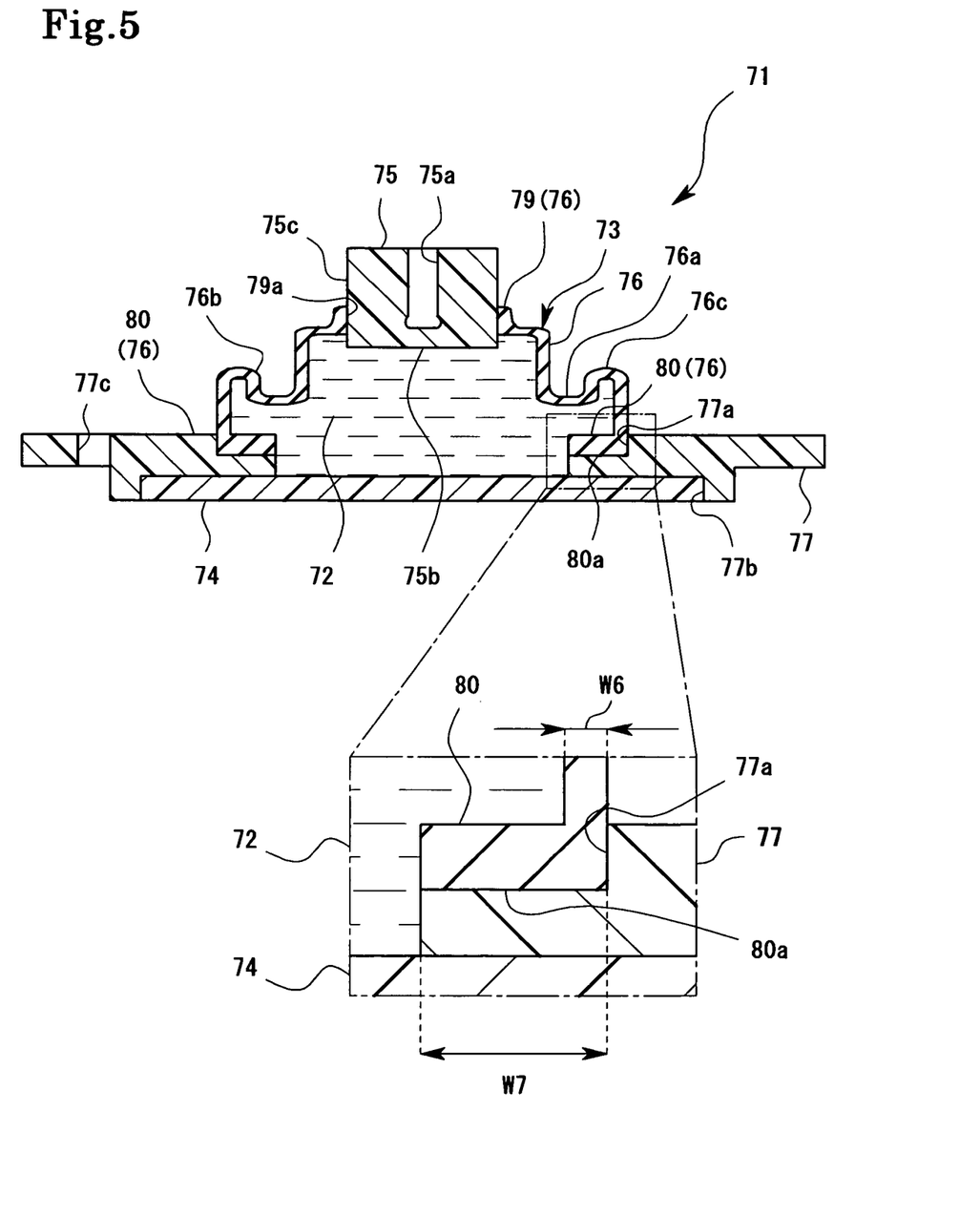
FIG. 5 is a cross-sectional view corresponding to FIG. 1, showing a viscous fluid-filled damper according to a third embodiment of the present invention.

FIG. 5

FIG. 5 shows a viscous fluid-filled damper 71 according to the third embodiment of the present invention. The viscous fluid-filled damper 71 according to the third embodiment of the present invention is different from the viscous fluid-filled damper 31 according to the first embodiment of the present invention in the direction in which a collar joint portion 80 provided on a firm fixation region 80a between a flexible portion 76 and an annular connection portion 77 is directed to. That is, the collar joint portion 80 is formed inward from the flexible portion 76. The viscous fluid-filled damper 71 according to the third embodiment of the present invention is identical to the viscous fluid-filled damper 31 according to the first embodiment of the present invention in other constructional details and the members to be used.

Since the width W7 of the projection plane of the collar joint portion 80 on a lid body 74 is larger than a thickness W6 of the flexible portion 76, the viscous fluid-filled damper 71 is also firmly coupled when a coupling top portion 75 greatly oscillates in various directions, that is, upward, downward, rightward, and leftward. Accordingly, a large coupling force between the collar joint portion 80 and the annular connection portion 77 is ensured even if the viscous fluid-filled damper 71 is formed with a reduced height. Also, the viscous fluid-filled damper 71 has a coupling force large enough to prevent the collar joint portion 80 and the annular connection portion 77 from being decoupled from each other even when the coupling top portion 75 greatly moves in various directions.

Modified Examples of Embodiments

Figure 6:
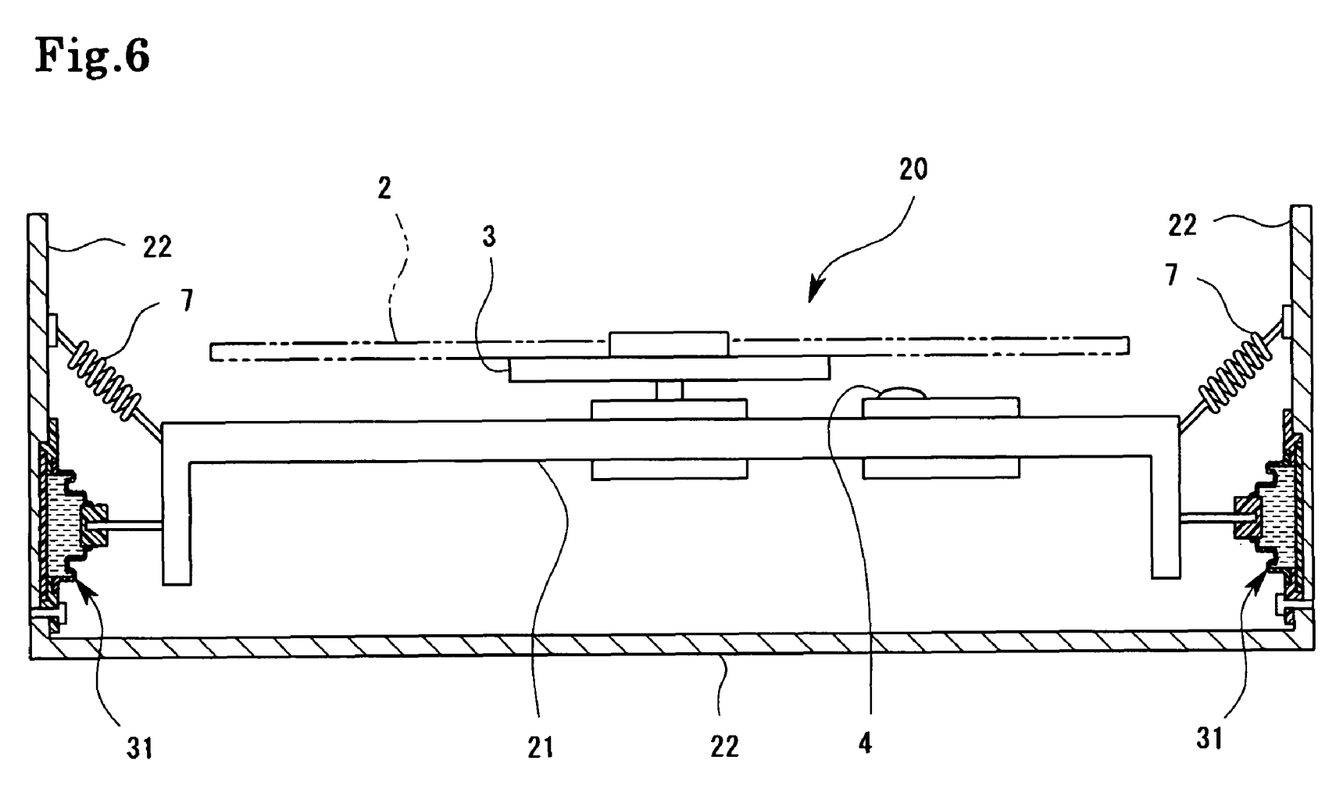
FIG. 6 is a schematic view showing a mounting structure of a viscous fluid-filled damper according to a modified example of the embodiments of the present invention, representing an internal structure of a disk device.
Figure 7:
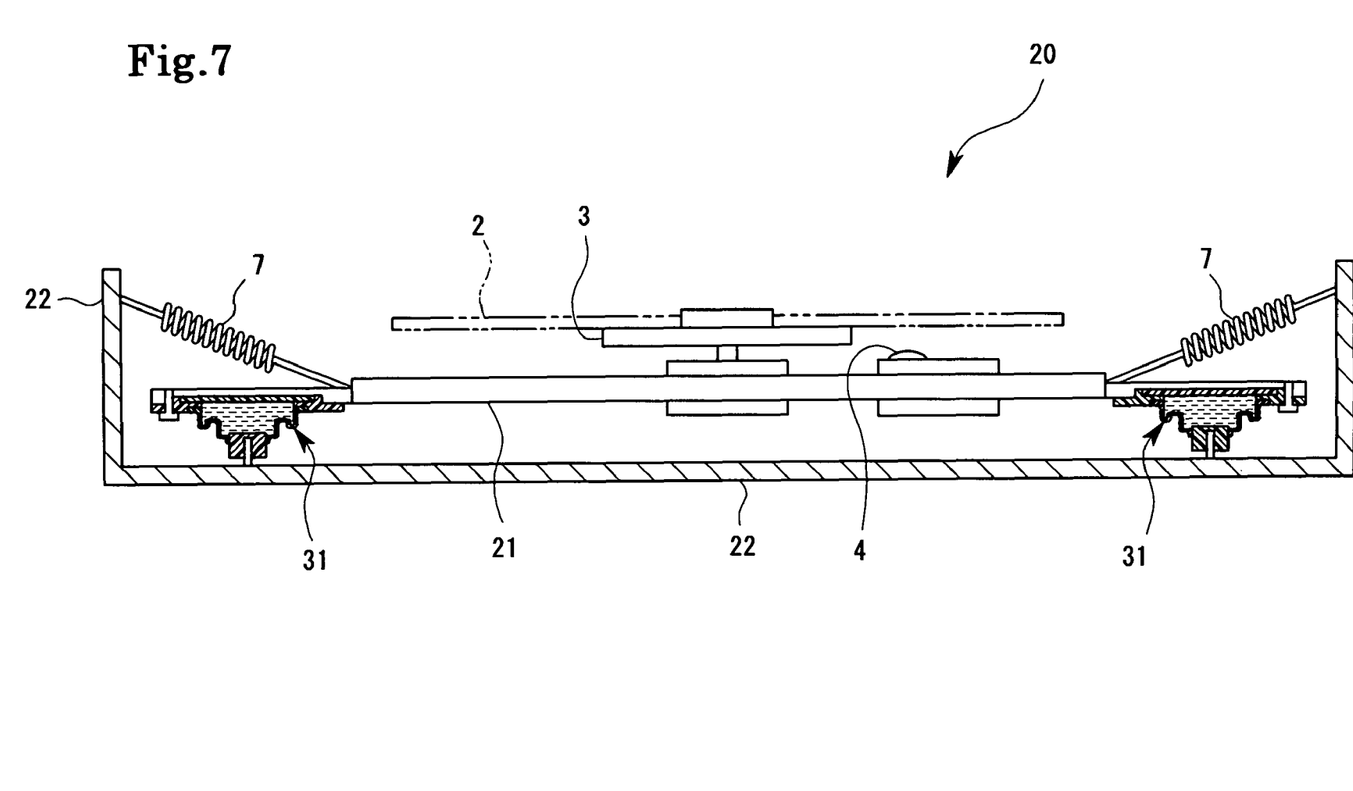
FIG. 7 is a schematic view showing a mounting structure of a viscous fluid-filled damper according to another modified example of the embodiments of the present invention while representing an internal structure of a disk device.

The viscous fluid-filled dampers 31, 51, and 71 according to the first to third embodiments, respectively, of the present invention, are each connected to the box body 22 by screwing. However, this should not be construed restrictively. For instance, it is also possible to adopt a construction in which each of the annular connection portions 37, 57, and 77 or the lid bodies 34, 54, and 74 are provided with projecting portions and the box body 22 is provided with a depressed portion so that they are fitted and coupled to each other. Alternatively, each of the viscous fluid-filled dampers may also have a predetermined coupling end shape referred to as snap fit to be mounted on the box body 22. Further, as shown in FIG. 6, the mounting position with respect to the mechanical chassis 21 may also be changed. As shown in FIG. 7, it is also possible to adopt a mounting structure in which the viscous fluid-filled damper 31 is connected at an upper side thereof and a lower side thereof to the box body 22 and the mechanical chassis 21, respectively.

In the respective embodiments of the present invention, the shaft receiving holes 35a, 55a, and 75a may assume a cross-sectional shape deformed so as to correspond to the shape of the shaft, for example, a triangle or a semicircle as well as an oblong or a circle.

Although the coupling top portions 35, 55, and 75 according to the foregoing respective embodiments of the present invention do not protrude far into the sealed container, the coupling top portions may also be constructed with a portion for stirring the viscous fluids 32, 52, and 72, such as the stirring recess portion 12 protruding into the sealed container, within a required height range for filling in a suitable amount of the viscous fluids 32, 52, and 72.

The present invention makes it possible to damp vibrations of a mechanical chassis composed of a motor, an optical pickup, a disk table, and the like, and thus can be employed to damp vibrations of a disk device such as an optical disk device or a magneto-optical disk device. However, the use of the present invention should not be limited to those disk devices. That is, the present invention may also be applied to various kinds of electric equipment and electronic equipment whose vibrations need to be controlled.

The description of the present invention should not be construed restrictively; advantages, features, and uses of the present invention will become still more apparent from the following description given with reference to the accompanying drawings. Further, it should be understood that all appropriate modifications made without departing from the gist of the present invention are covered by the scope of the present invention. While various embodiments of the present invention are described, it should be understood that they have been presented by way of example only, and not as a limitation. Thus, the breadth and scope of the present invention should not be limited by any of the above-described exemplary embodiments.

What is claimed is:

1. A viscous fluid-filled damper for damping vibrations transmitted between a supporting body and a supported body, comprising:
   a container body;
   a lid body for closing an opening end of the container body; and
   a viscous fluid filled in an inner space enclosed by the container body and the lid body, wherein:
   the container body is provided with a flexible portion made of an elastic material, and an annular connection portion made of a hard resin with a shape of a substantially flat plate and having an upper surface to which the flexible portion is firmly fixed and a lower surface to which the lid body is firmly fixed, the upper surface and the lower surface extending between the flexible portion and the lid body;
   the flexible portion has, on a firm fixation region thereof that is firmly fixed to the annular connection portion, a collar joint portion protruding widely in a direction of a plane of the annular connection portion;
   the flexible portion has a bellows portion with a corrugated longitudinal cross-sectional shape that is deformed through vibrations;
   the bellows portion has a valley portion formed as a depressed portion, and a mountain portion formed as a projecting portion;
   the valley portion has a bottom located on the lid body side with respect to a top of the mountain portion to allow the bellows portion to be displaced by a large distance in a horizontal direction and a vertical direction and the bottom of the valley portion is spaced from the lid body by a first distance;
   the flexible portion is provided, at an end thereof opposite to the annular connection portion, with a coupling top portion which is coupled to one of the supporting body and the supported body;

the coupling top portion includes a bottom surface spaced from the lid body by a second distance that is greater than the first distance;

the coupling top portion includes a top surface spaced from the bottom surface;

the top surface is external to the inner space and is spaced from the end of the flexible portion by a third distance; and the bottom surface contacts the viscous fluid and is spaced from the end of the flexible portion by a fourth distance.

2. A viscous fluid-filled damper for damping vibrations transmitted between a supporting body and a supported body, comprising:

a container body;

a lid body for closing an opening end of the container body; and a viscous fluid filled in an inner space enclosed by the container body and the lid body, wherein:

the container body is provided with a flexible portion made of an elastic material, a coupling top portion made of a hard resin having a shaft receiving hole; and an annular connection portion made of a hard resin with a shape of a substantially flat plate and having an upper surface to which the flexible portion is firmly fixed, the coupling top portion is separate and distinct from the annular connection portion;

the flexible portion has, on a firm fixation region thereof that is firmly fixed to the annular connection portion, a collar joint portion protruding widely in a direction of a plane of the annular connection portion;

the flexible portion is provided with the coupling top portion which is coupled to one of the supporting body and the supported body; and the coupling top portion has a bottom surface exposed to the inner space of the container body.

3. A viscous fluid-filled damper according to claim 1 or 2, wherein:

the collar joint portion is obliquely formed from the horizontal direction with respect to the lid body; and the firm fixation region between the collar joint portion and the annular connection portion has a projection plane projected on the lid body that has a horizontal width larger than a thickness of the bellows portion.

4. A viscous fluid-filled damper according to claim 1 or 2, wherein the collar joint portion is so formed as to extend toward an inner space of the viscous fluid-filled damper.

5. A viscous fluid-filled damper according to claim 1 or 2, wherein the coupling top portion is so formed as to be longer in a horizontal direction than in a vertical direction.

6. A viscous fluid-filled damper according to claim 1 or 2 wherein the coupling top portion does not substantially protrude toward an inner space of the container body.

7. A viscous fluid-filled damper according to claim 1, wherein the coupling top portion has a shaft receiving hole that corresponds in shape to a shaft provided on one of the supporting body and the supported body to receive the shaft.

8. A viscous fluid-filled damper according to claim 1 or 2, wherein:

the annular connection portion has a rubber-side recess portion for accommodating the collar joint portion, and a lid-side recess portion for accommodating the lid body; and the rubber-side recess portion and the lid-side recess portion are both wider in a horizontal direction than in a vertical direction.

9. A viscous fluid-filled damper according to claim 1 or 2, wherein the annular connection portion is provided with a coupling portion coupled to one of the supporting body and the supported body.

10. A viscous fluid-filled damper according to claim 1, wherein the lid body is made of a hard resin, and the lid body is fixed to the annular connection portion by ultrasonic fusing.

11. A viscous fluid-filled damper according to claim 1 or 2, wherein the coupling top portion is formed of hard resin material that is different from the elastic material of the flexible portion.

12. A viscous fluid-filled damper according to claim 1, wherein the fourth distance is substantially less than the third distance.

13. A viscous fluid-filled damper according to claim 1 or 2, wherein the coupling top portion is separate and distinct from the flexible portion.

14. A viscous fluid-filled damper according to claim 1 or 2, wherein the second distance is greater than the first distance in an unloaded state of the viscous fluid-filled damper.

15. A viscous fluid-filled damper according to claim 1 or 2, wherein the flexible portion is located between the coupling top portion and the annular connection portion.

16. A viscous fluid-filled damper, for damping vibrations transmitted between a supporting body and a supported body, comprising:

a container body;

a lid body for closing an opening end of the container body; and a viscous fluid filled in an inner space enclosed by the container body and the lid body, wherein:

the container body is provided with a flexible portion made of an elastic material, and an annular connection portion made of a hard resin with a shape of a substantially flat plate and having an upper surface to which the flexible portion is firmly fixed and a lower surface to which the lid body is firmly fixed, the upper surface and the lower surface extending between the flexible portion and the lid body;

the flexible portion has on a firm fixation region thereof that is firmly fixed to the annular connection portion, a collar joint portion protruding widely in a direction of a plane of the annular connection portion;

the flexible portion has a bellows portion with a corrugated longitudinal cross-sectional shape that is deformed through vibrations;

the bellows portion has a valley portion formed as a depressed portion, and a mountain portion formed as a projecting portion;

the valley portion has a bottom located on the lid body side with respect to a top of the mountain portion to allow the bellows portion to be displaced by a large distance in a horizontal direction and a vertical direction and the bottom of the valley portion is spaced from the lid body by a first distance;

the flexible portion is provided, at an end thereof opposite to the annular connection portion, with a coupling top portion which is coupled to one of the supporting body and the supported body;

the coupling top portion includes a bottom surface spaced from the lid body by a second distance that is greater than the first distance; and the coupling top portion has a bottom surface exposed to the inner space of the container body.

17. A viscous fluid-filled damper for damping vibrations transmitted between a supporting body and a supported body, comprising:

a container body;

a lid body for closing an opening end of the container body; and a viscous fluid filled in an inner space enclosed by the container body and the lid body, wherein:

the container body is provided with a coupling top portion made of a hard resin which is coupled to one of the supporting body and the supported body, a flexible portion made of an elastic material, and an annular connection portion made of a hard resin and having an upper surface to which the flexible portion is firmly fixed and a lower surface to which the lid body is firmly fixed, the upper surface and the lower surface extending between the flexible portion and the lid body;

the coupling top portion is so formed as to be larger in width than in height;

the flexible portion has a bellows portion with a corrugated longitudinal cross-section that is deformed through vibrations, and a collar joint portion firmly fixed to the annular connection portion;

the bellows portion has a valley portion formed as a depressed portion, and a mountain portion formed as a projecting portion;

the valley portion has a bottom located on the lid body side with respect to a top of the mountain portion; the collar joint portion protrudes widely in a horizontal direction;

the annular connection portion assumes a shape of a substantially flat plate; and the coupling top portion has a bottom surface exposed to the inner space of the container body.

18. A viscous fluid-filled damper according to claim 1 or 2, wherein:

the firm fixation region between the collar joint portion and the annular connection portion has a horizontal width with respect to the lid body that is larger than a thickness of the bellows portion.

* * * * *